United States Patent
Deschatres et al.

(10) Patent No.: US 7,374,234 B2
(45) Date of Patent: May 20, 2008

(54) DRAINAGE DEVICE

(75) Inventors: Bernard Deschatres, Saint Sauver Givre en Mai (FR); Pascal Becot, Saint Paul du Bois (FR)

(73) Assignee: Heuliez, Cerizay (FR)

( * ) Notice: Subject to any disclaimer, the term of this patent is extended or adjusted under 35 U.S.C. 154(b) by 0 days.

(21) Appl. No.: 11/583,151

(22) Filed: Oct. 19, 2006

(65) Prior Publication Data
US 2007/0102953 A1 May 10, 2007

(30) Foreign Application Priority Data
Nov. 4, 2005 (FR) ................................. 05 11234

(51) Int. Cl.
*B60J 10/08* (2006.01)
(52) U.S. Cl. ...................... 296/208; 296/213
(58) Field of Classification Search ................ 296/208, 296/213
See application file for complete search history.

(56) References Cited

U.S. PATENT DOCUMENTS 6,443,519 B1 9/2002 Betzl

FOREIGN PATENT DOCUMENTS

DE 103 11 652 B3 11/2004
EP 1 512 571 A 3/2005

*Primary Examiner*—Joseph D Pape
(74) *Attorney, Agent, or Firm*—Miles & Stockbridge P.C.

(57) ABSTRACT

Device for draining water from at least one gutter of a retractable vehicle roof, characterized in that the intermediate conduit (9), which is linked to the movement of the moving roof, is attached by its upstream part (9A) to the drain (8) and linked by its downstream part (9B) to the drainage conduit (10) by a nesting joint (11), so that when the moving roof moves into the stowed position, this downstream part (9B) is denested so as to break the continuity, and vice versa when the mobile roof covers the passenger compartment.

19 Claims, 2 Drawing Sheets

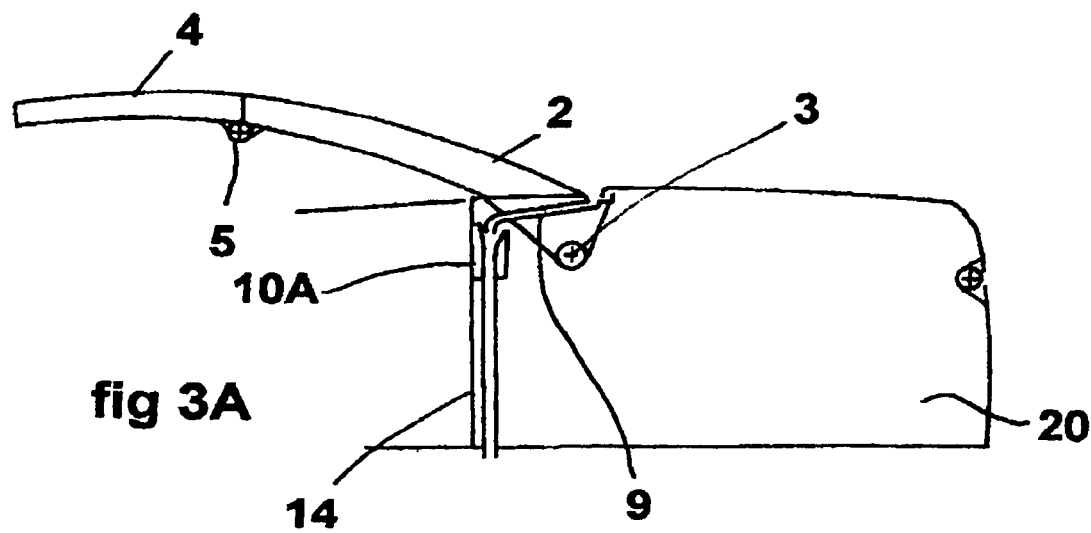
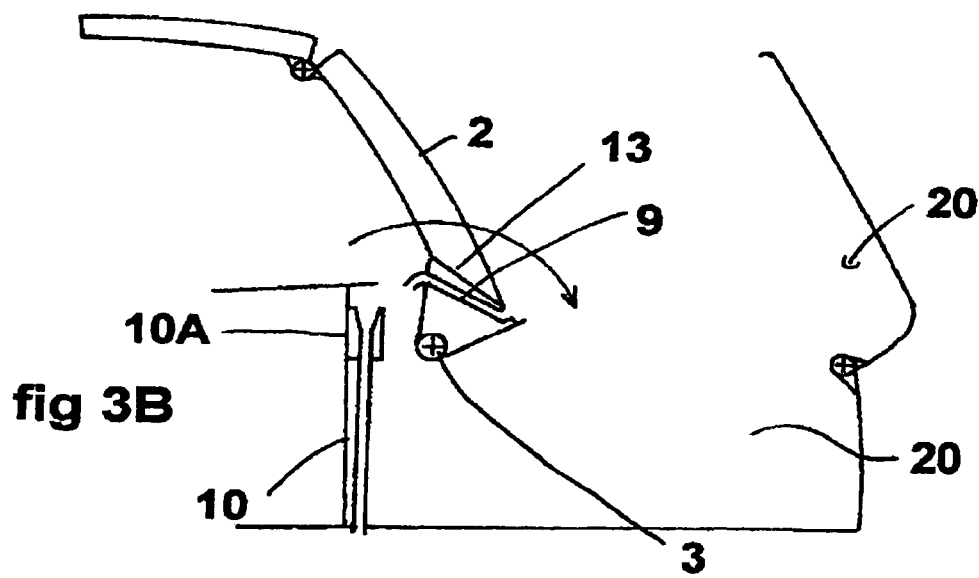
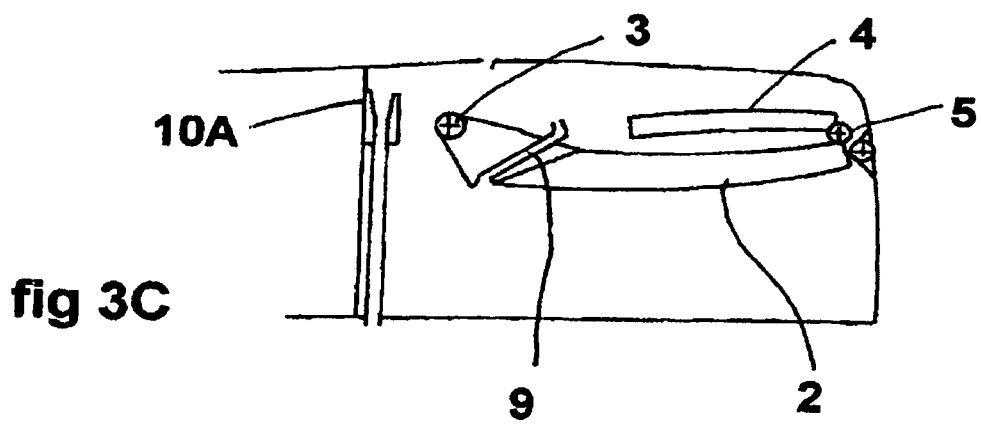

DRAINAGE DEVICE

FIELD OF THE INVENTION

The invention relates to a water drainage device for a retractable vehicle roof.

BACKGROUND OF THE INVENTION

A moving retractable roof generally includes lateral gutters along the lateral edges of retractable roof elements and a transverse gutter located at the base of the rear window or rear roof element.

The function of these gutters is to collect the water that flows from the roof and, in particular, passes over the sealing means provided between the various roof elements or panels composing the roof and the fixed structure.

This collected water must be drained to the ground through a drainage conduit, generally placed inside the body.

In vehicles with retractable roofs, the roof elements are movable relative to the fixed drainage conduit, and this poses a problem for the channeling of the collected water.

To obviate this problem, it is known from EP 1 281 547 to provide at the outlet of the gutter, between the collector and the drainage conduit, a flexible conduit whose length is greater than the distance between the collector and the drainage conduit.

As a result of its length and flexibility, the movement of the roof is made possible. This flexible conduit is attached at its two ends, i.e. to the collector and to the drainage conduit.

Unfortunately, however, there is wear on this conduit linked to the repeated operations of the roof. These operations fold the conduit each time, thereby weakening it in certain places.

This wear can be accentuated over time due to the aging of the material, which becomes more brittle.

SUMMARY OF THE INVENTION

The invention offers a more reliable drainage device.

To this end, the invention relates to a device for draining water from at least one gutter of a retractable vehicle roof that can be moved between a stowed position and a position in which it covers the passenger compartment, this drainage device comprising a drain presented by one of the moving roof elements, a drainage conduit attached to the body of the vehicle, and an intermediate conduit, this device being characterized in that the intermediate conduit, which is linked to the movement of the moving roof, is attached by its upstream part to the drain and linked by its downstream part to the drainage conduit by a nesting joint, so that when the moving roof is moved into the stowed position, this downstream part is denested so as to break the continuity, and vice versa when the moving roof covers the passenger compartment.

BRIEF DESCRIPTION OF THE DRAWINGS

The invention will be clearly understood with the help of the description below, given as a non-limiting example in reference to the drawing, which schematically represents FIGS. 3A through 3C: the kinematics of the roof and the drainage device.

DESCRIPTION OF THE PREFERRED EMBODIMENTS

Figure 1:
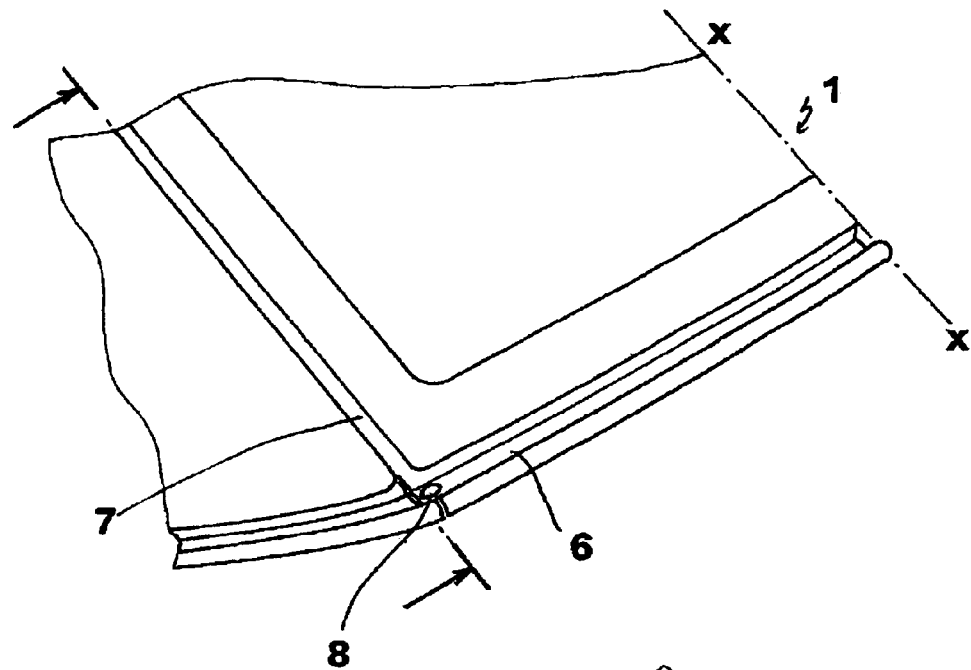
FIG. 1: a partial three-quarter rear view of a moving roof

Referring to the drawing, we see a retractable vehicle roof 1.

Figure 2:
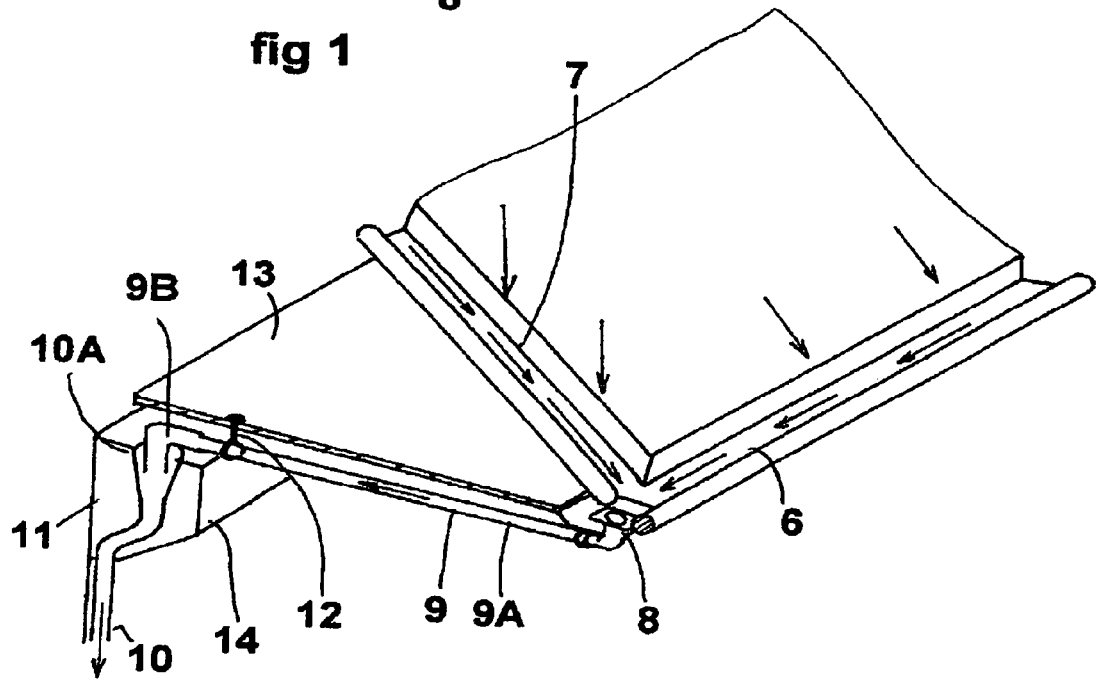
FIG. 2: the roof of FIG. 1 with the drainage device housed inside the vehicle

As we can see, this retractable roof can occupy a stowed position (FIG. 3C) in which it is housed inside a trunk 20 and a position in which this roof covers the passenger compartment (FIGS. 1, 2 and 3A).

As may be seen in FIG. 3A, the rear roof element 2 is mounted so as to pivot around a transverse rod 3 borne by the body of the vehicle, and the front roof element 4 is articulated around a second transverse rod 5 on the front edge of the rear roof element.

The device for controlling this roof is not shown in order to simplify the drawing.

Gutters 6, 7 run along the edges of this retractable roof.

In particular, we can see that the transverse gutter 6 located between the base of the moving roof and the lid of the trunk comprises at a bottom point a drain 8 that is extended by an intermediate conduit 9, which is itself extended by a drainage conduit 10 located inside the body of the vehicle.

The term conduit is understood to mean a tubular element that is open at both ends, the opposite of a gutter.

The collected water is drained by gravity through this drainage device.

According to the invention, the intermediate conduit 9, which is linked to the movement of the moving roof, is attached by its upstream part 9A to the drain 8 and joined by its downstream part 9B to the drainage conduit 10 by a nesting joint 11, so that when the moving roof is moved into its stowed position, this downstream part 9B is denested so as to break the continuity, and vice versa when the moving roof covers the passenger compartment.

Thus, the nesting joint makes it possible to separate the intermediate conduit 9 from the drainage conduit 10 when the roof is stowed and to reestablish the hydraulic joint when the roof is in place. This nesting occurs with a significant amount of play so as not to force the conduits during nesting and denesting.

The downstream part 9B of the intermediate conduit is directed downward so that the pivoting movement of the roof inserts it automatically into a female part 10A of the drainage conduit, which can be funnel-shaped, i.e. having a conical part.

The intermediate conduit can thus be rigid and linked at least indirectly to the rear roof element or to a panel attached to it.

As may be seen in FIG. 2, the drain 8 is extended by an angled part that connects to the intermediate conduit 9, which is attached by mounting means 12 underneath the panel 13. The mounting means could be quick fastening means such as clips, etc.

The intermediate conduit 9 could be partially integrated into the thickness of the panel 13. This panel can advantageously form the rear deck. It can also be linked to the rear roof element.

This intermediate conduit can be partially flexible or rigid. It does not really matter, since it follows the movement of the element to which it is attached, for example by means of quick fasteners. It is not folded when the roof moves.

The free end part of this intermediate conduit 9 has an angled section so that the rigid end faces downward and is easily inserted into a female part 10A of larger cross-section when the roof is in the position covering the passenger compartment. This female part is the inlet of the drainage conduit, which is integral with the body and, for example, with a partition 14 or a structural element. This drainage conduit can be integrated into the partition.

It is possible, if necessary, to dispose a flexible joint at the nesting point between the end part of the intermediate conduit and the female part 10A. This flexible joint is, for example, attached to the female part and includes an opening into which the downstream end part of the intermediate part is inserted. It is active when the moving roof covers the passenger compartment.

FIGS. 3A through 3C show the kinematics of this drainage device.

In FIG. 3B, we see that the roof is in the process of moving, the lid of the trunk being open. The downstream end of the intermediate conduit is disengaged from the drainage conduit and moves at the same time as the roof.

It is possible to provide a drainage device on each side of the vehicle.

The drain is capable of collecting the water coming from at least one gutter disposed between roof elements that move in relation to one another.

The invention claimed is:

1. A drainage device for draining water from at least one gutter of a retractable roof of a vehicle movable between a stowed position and a position in which it covers a passenger compartment of the vehicle, said drainage device comprising a drain presented by one of a moving roof element for collecting water from a roof and/or a moveable gutter, a drainage conduit attached to the body of the vehicle, and a moveable intermediate conduits (9), said device comprising means for linking the moveable intermediate conduit (9), to the movement of the retractable roof, said moveable intermediate conduit having an upstream part (9A) for attaching said moveable intermediate conduit to a moveable drain (8) and a downstream part (9B) to the drainage conduit (10) by a nesting joint (11), so that when the retractable roof moves into the stowed position, said downstream part (9B) is denested from the nesting joint (11) so as to break continuity, and vice versa when the retractable roof covers the passenger compartment.

2. A drainage device according to claim 1 characterized in that said nesting joint has significant amount of play when nesting occurs.

3. A drainage device according to claim 1 characterized in that the drainage conduit has a conical female part.

4. A drainage device according to claim 1 characterized in that the intermediate conduit is linked to a roof element and/or a panel.

5. A drainage device according to claim 4 comprising a quick fastener means for attaching the intermediate conduit.

6. A drainage device according to claim 4 characterized in that the intermediate conduit is partially integrated into the thickness of a panel.

7. A drainage device according to claims claim 1, characterized in that the downstream part (9B) of the intermediate conduit is directed downward so that the movement of the roof in a first direction automatically inserts the downstream part of the intermediate conduit into a female part (10A) of the drainage conduit, and a movement of the roof in a second direction disengages the downstream part from the female part.

8. A drainage device according to claim 1, characterized in that the drain is constructed and arranged to collect water coming from at least one gutter disposed between roof elements that can move in relation to one another.

9. A drainage device according to claim 1, comprising a flexible joint between the downstream part of the intermediate conduit and the drainage conduit that is active when the moving roof covers the passenger compartment.

10. A drainage device according to claim 1, characterized in that the intermediate conduit is rigid, at least locally in its downstream part.

11. A drainage device according to claim 2, characterized in that the drainage conduit has a conical female part.

12. A drainage device according to claim 7, characterized in that said nesting joint has a significant amount of play when nesting occurs.

13. A drainage device according to claim 12, characterized in that the drainage conduit has a conical female part.

14. A drainage device according to claim 12, characterized in that the intermediate conduit is linked to a roof element.

15. A drainage device according to claim 14 comprising a quick fastener means for attaching the intermediate conduit.

16. A drainage device according to claim 14, characterized in that the intermediate conduit is partially integrated into the thickness of a panel.

17. A drainage device according to claim 7, characterized in that the drain is constructed and arranged to collect water coming from at least one gutter disposed between roof elements that can move in relation to one another.

18. A drainage device according to claim 7, comprising a flexible joint between the downstream part of the intermediate conduit and the drainage conduit that is active when the moving roof covers the passenger compartment.

19. A drainage device according to claim 7, characterized in that the intermediate conduit is rigid, at least locally in its downstream part.

* * * * *